United States Patent
Ko et al.

(10) Patent No.: US 10,220,844 B2
(45) Date of Patent: Mar. 5, 2019

(54) VEHICLE AND CONTROL METHOD THEREOF

(71) Applicant: HYUNDAI MOTOR COMPANY, Seoul (KR)

(72) Inventors: HyeongMin Ko, Ansan-si (KR); Jaewoong Choi, Seoul (KR); Dae Seok Jeon, Hwaseong-si (KR)

(73) Assignee: HUYNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 15/470,782

(22) Filed: Mar. 27, 2017

(65) Prior Publication Data

US 2018/0141546 A1    May 24, 2018

(30) Foreign Application Priority Data

Nov. 24, 2016    (KR) .................. 10-2016-0157360

(51) Int. Cl.
| | |
|---|---|
| *B60W 30/09* | (2012.01) |
| *B60W 30/095* | (2012.01) |
| *B60W 50/14* | (2012.01) |
| *B60W 10/18* | (2012.01) |
| B60W 30/12 | (2006.01) |

(52) U.S. Cl.
CPC ............ *B60W 30/09* (2013.01); *B60W 10/18* (2013.01); *B60W 30/095* (2013.01); *B60W 50/14* (2013.01); *B60W 30/0953* (2013.01); *B60W 30/0956* (2013.01); *B60W 30/12* (2013.01); *B60W 2050/143* (2013.01); *B60W 2050/146* (2013.01); *B60W 2520/14* (2013.01); *B60W 2540/18* (2013.01); *B60W 2550/10* (2013.01)

(58) Field of Classification Search
CPC .... B60W 30/09; B60W 30/095; B60W 30/12; B60W 30/0956; B60W 30/0953
See application file for complete search history.

(56) References Cited

U.S. PATENT DOCUMENTS

| | | | | |
|---|---|---|---|---|
| 5,386,365 A | * | 1/1995 | Nagaoka ................ | B62D 7/159 701/44 |
| 5,939,976 A | | 8/1999 | Sasaki et al. | |
| 2006/0197377 A1 | * | 9/2006 | Takahashi ............. | B60T 8/1755 303/146 |

(Continued)

FOREIGN PATENT DOCUMENTS

| | | |
|---|---|---|
| JP | 10111136 A | 4/1998 |
| JP | 2000-171560 A | 6/2000 |

(Continued)

OTHER PUBLICATIONS

Notice of Allowance of corresponding Korean Patent Application No. 10-2016-0157360, English Translation—1 pages (Sep. 5, 2018).

*Primary Examiner* — Mary Cheung
(74) *Attorney, Agent, or Firm* — Knobbe Martens Olson & Bear LLP

(57) ABSTRACT

A vehicle having a system for detecting another vehicle is disclosed. The vehicle includes a vehicle sensor configured to sense a steering angle and a yaw rate of the vehicle. The vehicle also has a computing system configured to detect another vehicle within an adjustable angular range from a point of the vehicle. The angular range for detecting another vehicle is adjusted using at least one of the vehicle's current steering angle and yaw rate.

18 Claims, 12 Drawing Sheets

(56) References Cited

U.S. PATENT DOCUMENTS

| | | | | |
|---|---|---|---|---|
| 2008/0319613 | A1* | 12/2008 | Mikuriya | B62D 6/003 |
| | | | | 701/42 |
| 2010/0324752 | A1* | 12/2010 | Suganuma | B60W 40/076 |
| | | | | 701/1 |
| 2011/0234804 | A1* | 9/2011 | Matsuda | B60R 1/00 |
| | | | | 348/148 |
| 2015/0291210 | A1* | 10/2015 | Kageyama | B60T 8/1755 |
| | | | | 701/41 |

FOREIGN PATENT DOCUMENTS

| | | |
|---|---|---|
| JP | 2002-269699 A | 9/2002 |
| JP | 2010-44461 A | 2/2010 |
| JP | 2011-164760 A | 8/2011 |
| JP | 5590684 B2 | 9/2014 |
| JP | 2016-175567 A | 10/2016 |
| KR | 10-2011-0097091 A | 8/2011 |

* cited by examiner

VEHICLE AND CONTROL METHOD THEREOF

CROSS-REFERENCE TO RELATED APPLICATION

This application claims the benefit of Korean Patent Application No. 10-2016-0157360, filed on Nov. 24, 2016 in the Korean Intellectual Property Office, the disclosure of which is incorporated herein by reference.

BACKGROUND

1. Field

Embodiments of the present disclosure relate to a vehicle and a control method thereof.

2. Description of the Related Art

Recently, various additional service apparatuses for vehicle are being developed in consideration of a driver's convenience and safety.

Specifically, the additional service apparatuses for vehicle include a safety assistance apparatus such as a lane departure warning apparatus for assisting a driver's handle manipulation when a vehicle travels on a road to prevent the vehicle from departing from a driving lane, and an additional service providing apparatus such as navigation system for providing information about a route to a destination selected by a driver and surrounding information according to the route.

In addition, many vehicles provide a service of warning, if detecting an oncoming vehicle including vehicles coming in the opposite direction while traveling, the risk of collision with the oncoming vehicle so that a driver can recognize the risk of collision.

However, since a vehicle travels in various driving patterns, such as driving straight and turning, and various situations occur such as a situation in which an oncoming vehicle appears suddenly in a blind area, throughout research into a method of detecting an oncoming vehicle is required.

The disclosure of this section is to provide background of the invention. Applicant notes that this section may contain information available before this application. However, by providing this section, Applicant does not admit that any information contained in this section constitutes prior art.

SUMMARY

Therefore, it is an aspect of the present disclosure to provide a method of detecting a target vehicle that may act as a risk factor among oncoming vehicles according to a situation before/after the vehicle turns, and to provide a method of controlling a subject vehicle when it is determined that there is a risk of collision with another vehicle.

Additional aspects of the disclosure will be set forth in part in the description which follows and, in part, will be obvious from the description, or may be learned by practice of the disclosure.

In accordance with one aspect of the present disclosure, a vehicle having a vehicle sensor configured to sense a state of the vehicle including a steering angle and a yaw rate of the vehicle; and a controller configured to calculate a yaw of the vehicle, if a turning time of the vehicle is detected based on information sensed through the vehicle sensor, to set a target yaw after turning, and to detect a target vehicle located within the target yaw after turning.

The vehicle sensor may include a yaw rate sensor, and the controller may calculate the yaw of the vehicle by integrating a yaw rate value measured through the yaw rate sensor from the turning time of the vehicle to a current time.

The controller may set the target yaw after turning by using the yaw of the vehicle to calculate a range that is greater than or equal to a value obtained by subtracting the yaw of the vehicle from 180 degrees with respect to the vehicle and that is smaller than or equal to a value obtained by adding the yaw of the vehicle to 180 degrees with respect to the vehicle.

The controller may set the target yaw after turning to a range that is greater than or equal to a value obtained by subtracting the yaw of the vehicle from 180 degrees and then further subtracting an error value from the result of the subtraction.

The controller may detect a target vehicle from among one or more oncoming vehicles located within a target yaw before turning, based on the information sensed through the vehicle sensor.

The controller may set the target yaw before turning to a range that is greater than or equal to a value obtained by subtracting an error value from 180 degrees with respect to the vehicle and that is smaller than or equal to a value obtained by adding an error value to 180 degrees with respect to the vehicle.

The controller may determine that the vehicle intends to turn if a steering angle signal and a steering angular speed value measured by the vehicle sensor are greater than or equal to a reference value.

The controller may determine whether there is a risk of collision of the vehicle with the target vehicle, and if the controller determines that there is a risk of collision of the vehicle with the target vehicle, the controller performs sudden brake control.

The controller may estimate a trajectory of the target vehicle based on speed and location information of the target vehicle, and determines whether there is a risk of collision of the vehicle with the target vehicle, using the trajectory of the target vehicle and a trajectory of the vehicle.

The vehicle may further include a display configured to display the risk of collision of the vehicle with the target vehicle; and an output device configured to output the risk of collision of the vehicle with the target vehicle in the form of voice.

In accordance with one aspect of the present disclosure, a control method of a vehicle includes determining whether the vehicle turns; calculating a yaw of the vehicle if a turning time of the vehicle is detected; setting a target yaw after turning using the yaw of the vehicle; and detecting a target vehicle located within the target yaw after turning.

The calculating of the yaw of the vehicle may calculating the yaw of the vehicle by integrating a yaw rate value of the vehicle measured through a yaw rate sensor from the turning time of the vehicle to a current time.

The setting of the target yaw after turning may setting the target yaw after turning by using the yaw of the vehicle to calculate a range that is greater than or equal to a value obtained by subtracting the yaw of the vehicle from 180 degrees with respect to the vehicle and that is smaller than or equal to a value obtained by adding the yaw of the vehicle to 180 degrees with respect to the vehicle.

The control method may setting of the target yaw after turning may setting the target yaw after turning to a range that is greater than or equal to a value obtained by subtracting the yaw of the vehicle from 180 degrees and then further subtracting an error value from the result of the subtraction.

The control method may further include outputting notification of detection of the target vehicle in the form of text or voice, after detecting the target vehicle.

The control method may further includes after detecting the target vehicle: determining whether there is a risk of collision of the vehicle with the target vehicle; and performing sudden brake control, if the controller determines that there is a risk of collision of the vehicle with the target vehicle.

The determining of whether there is the risk of collision of the vehicle with the target vehicle may include estimating a trajectory of the target vehicle based on speed and location information of the target vehicle; and determining whether there is a risk of collision of the vehicle with the target vehicle, using the trajectory of the target vehicle and a trajectory of the vehicle.

The performing of the sudden brake control may further include displaying the risk of collision of the vehicle with the target vehicle in the form of text, or outputting the risk of collision of the vehicle with the target vehicle in the form of voice.

BRIEF DESCRIPTION OF THE DRAWINGS

These and/or other aspects of the disclosure will become apparent and more readily appreciated from the following description of embodiments of the invention, taken in conjunction with the accompanying drawings of which.

DETAILED DESCRIPTION

Figure 1:
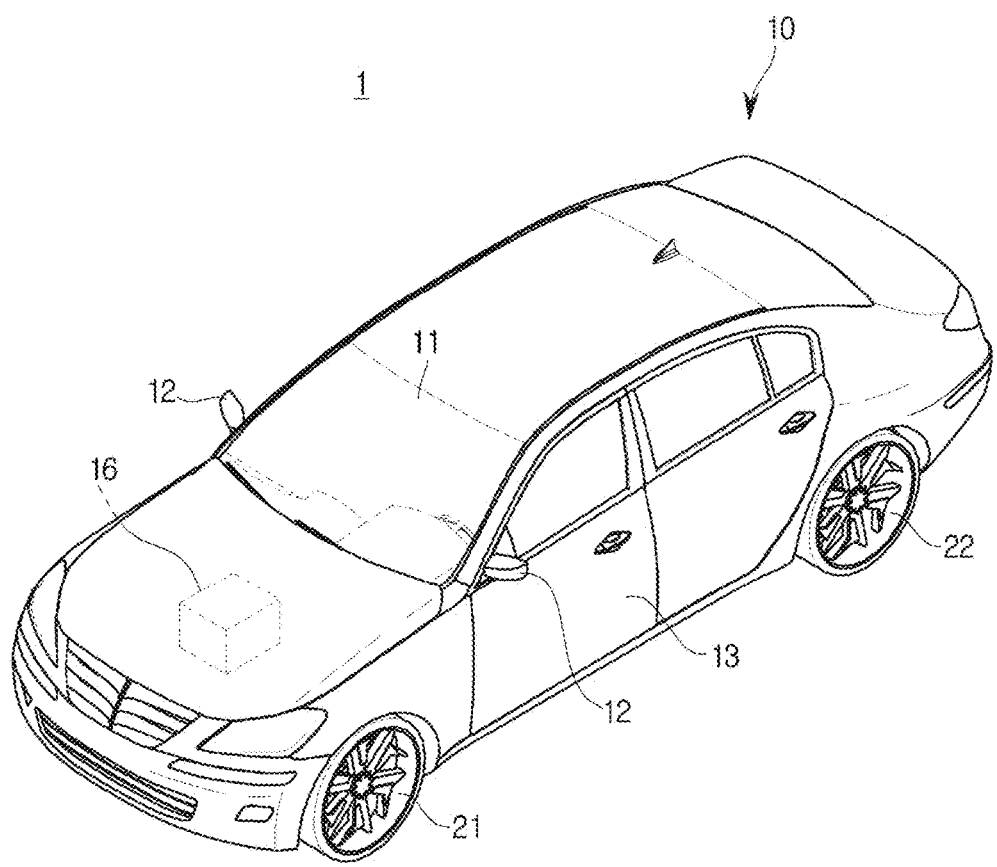
FIG. 1 shows the outer appearance of a vehicle.

Like numbers refer to like elements throughout this specification. This specification does not describe all components of embodiments, and general information in the technical field to which the present disclosure belongs or overlapping information between embodiments will not be described. The terms "part", "module", "element", and "block", as used herein, may be implemented as software or hardware, and according to embodiments, a plurality of "part", "module", "element", and "block" may be implemented as a single component, or a single "part", "module", "element", and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the operation principle and embodiments of the present disclosure will be described with reference to the accompanying drawings.

Figure 5:
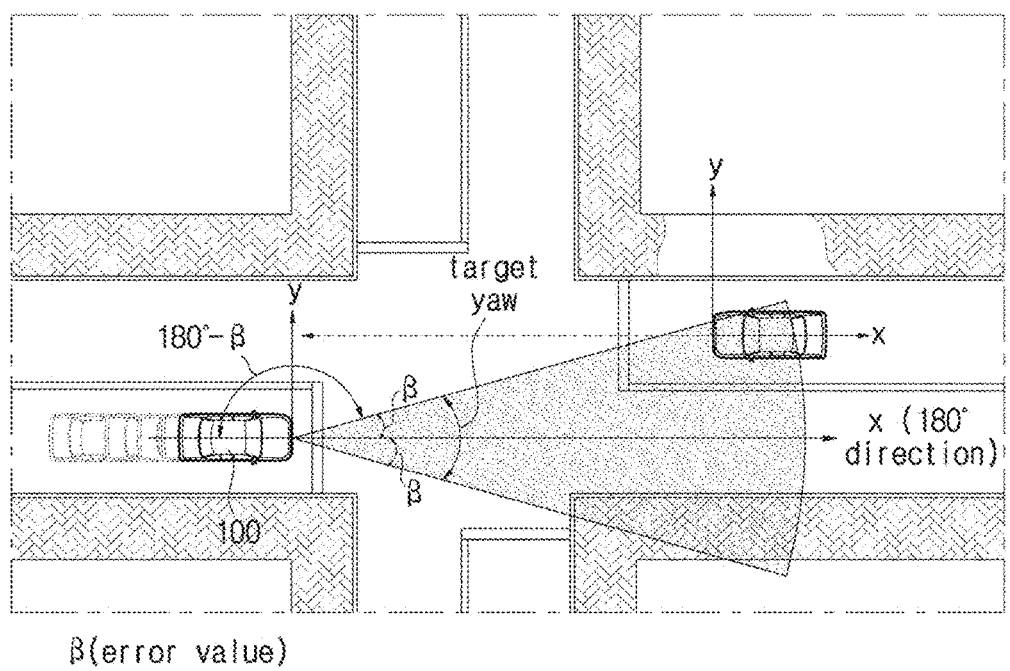
FIGS. 5 and 6 are shows examples for describing a method of detecting a target vehicle before a vehicle turns.

An aspect of the present invention provides an on-board system of a vehicle for detecting objects or other vehicles. The system is configured to detect objects or other vehicle within an angular range from a point of the subject vehicle when viewed from over the subject vehicle. In embodiment, the angular range for detecting objects or other vehicle is adjusted as the subject vehicle makes a turn (yaw). Referring to FIG. 5, when the vehicle is moving straight or stopping, the angular range for detecting objects (target yaw) is symmetric with respect to the forward direction (the x-axis direction).

Figure 7:
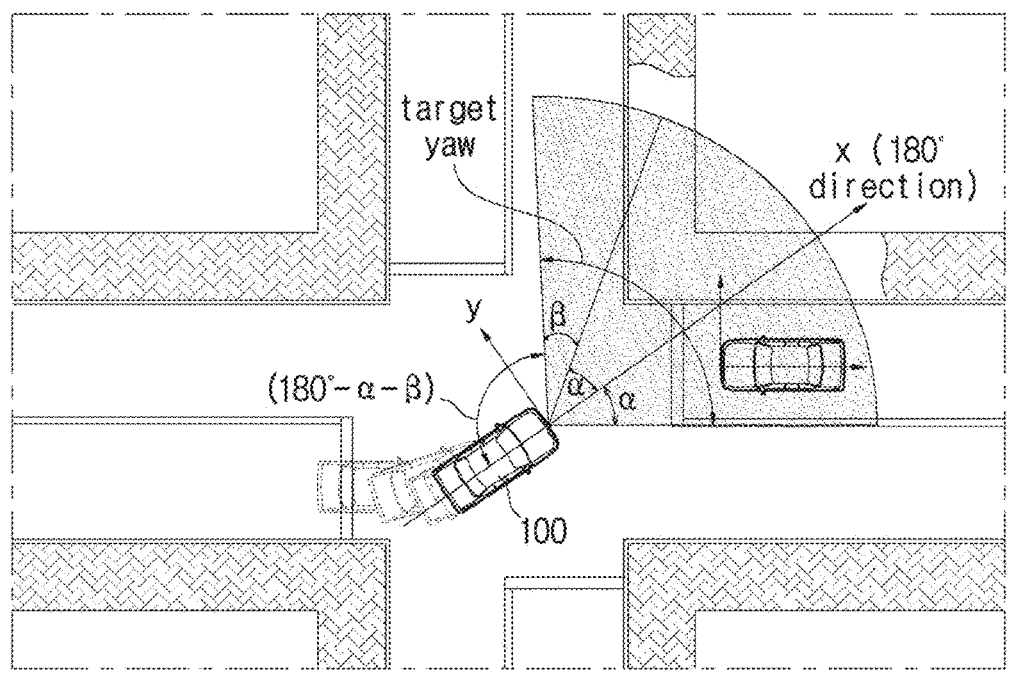
FIGS. 7 to 10 are shows examples for describing a method of detecting a target vehicle after a vehicle turns.

In embodiments, the on-board system is configured to monitor the vehicle is moving direction using signals from at least one sensor 130 installed in the vehicle. The on-board system determines that the vehicle is making a turn when a yaw rate (a rate of steering angle change) is greater than a predetermined reference. When it is determined that the vehicle is making a turn, the on-board system is configured to adjust the angular range (target yaw) for detecting other vehicles or objects. In embodiments, the angular range is adjusted using at least one of the vehicle's current yaw rate (steering angle change rate) and the vehicle's current direction (yaw angle). Referring to FIG. 7, the range for detecting or monitoring other vehicles is asymmetric with respect to the forward direction (the x-axis direction). Subsequently, when the vehicle's yaw speed (yaw rate, steering angle change rate) falls below a predetermined reference, the on-board system is configured to determine that the vehicle is now moving straight again or ended its turning, and configured to adjust the angular range (target yaw) for object detection to a range symmetric with respect to its current forward direction.

FIG. 1 shows the outer appearance of a vehicle.

Referring to FIG. 1, a vehicle 1 may include a main body 10 forming the outer appearance of the vehicle 1, a windscreen 11 configured to provide a driver with a front view of the vehicle 1, a plurality of side-view mirrors 12 configured to provide the driver with side and rear views of the vehicle 1, a plurality of doors 13 configured to shield the inside of the vehicle 1 from the outside, and a plurality of wheels 21 and 22 including front wheels 21 disposed in the front portion of the vehicle 1 and rear wheels 22 disposed in the rear portion of the vehicle 1 and configured to move the vehicle 1.

The windscreen 11 may be disposed in the front upper portion of the main body 10 to enable the driver inside the vehicle 1 to acquire visual information of a front view of the vehicle 1. Also, the side-view mirrors 12 may include a left side-view mirror disposed to the left of the main body 10 and a right side-view mirror disposed to the right of the main body 10 so that the driver inside the vehicle 1 can acquire visual information about side and rear views of the vehicle 1.

The doors 13 may be rotatably provided to the left and right of the main body 10 to allow the driver to open one of them and get into the vehicle 1. Also, the doors 13 may shield the interior of the vehicle 1 from the outside when all of them close.

In addition to the above-described components, the vehicle 1 may include a power apparatus 16 configured to rotate the wheels 21 and 22, a steering apparatus configured to change the movement direction of the vehicle 1, and a brake apparatus configured to stop movement of the wheels 21 and 22.

The power apparatus 16 may provide the front wheels 21 or the rear wheels 22 with rotatory power so that the main body 10 can move forward or backward. The power apparatus 16 may include an engine to burn fossil fuel to produce rotatory power, or a motor to receive power from a condenser to produce rotatory power.

The steering apparatus may include a steering handle (42 of FIG. 2) configured to receive a driving direction from the driver, a steering gear configured to change a rotatory motion of the steering handle 42 to a reciprocating motion, and a steering link configured to transfer the reciprocating motion of the steering gear to the front wheels 21. The steering apparatus may change the directions of the rotation shafts of the wheels 21 and 22, thereby changing the driving direction of the vehicle 1.

The brake apparatus may include a brake pedal configured to receive a brake manipulation from the driver, a brake drum coupled with the wheels 21 and 22, and a brake shoe configured to brake the rotation of the brake drum using a friction force. The brake apparatus may brake the driving of the vehicle 1 by stopping rotation of the wheels 21 and 22.

Figure 2:
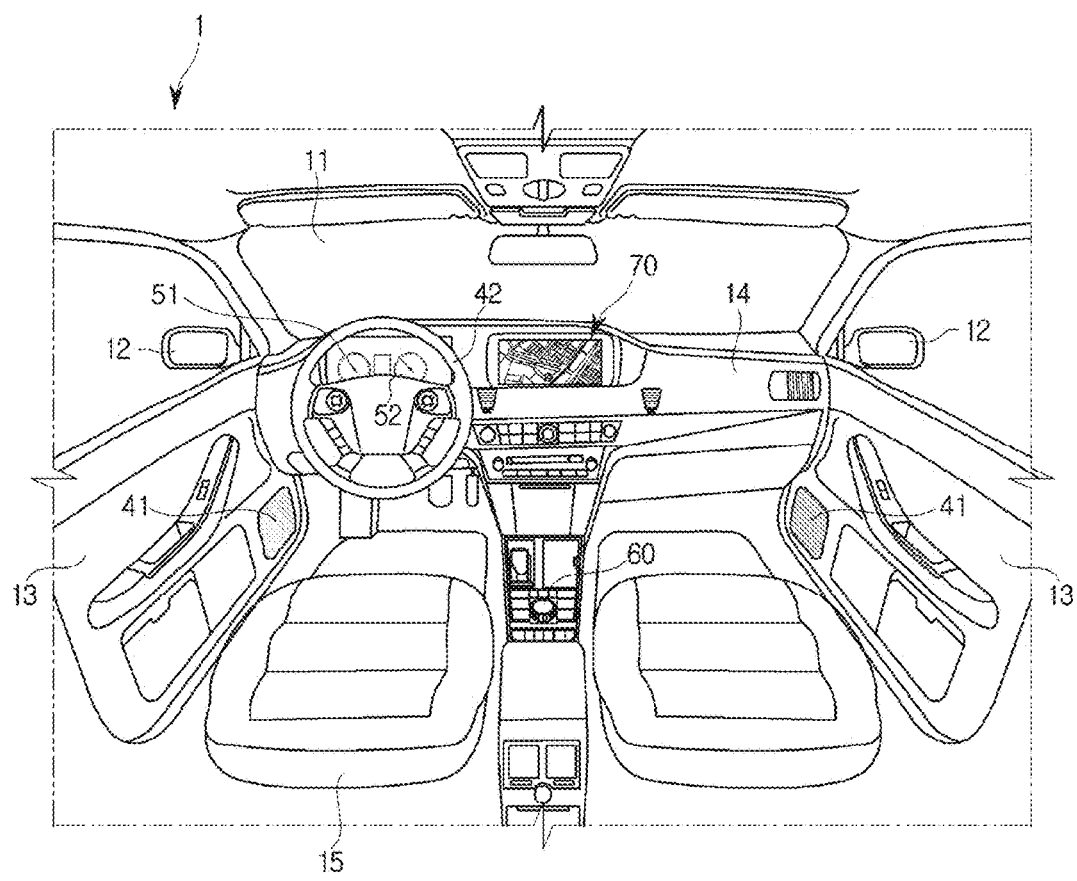
FIG. 2 shows the interior of a vehicle.

FIG. 2 shows the interior of a vehicle.

In the interior of the vehicle 1, a dashboard 14 in which various kinds of devices for enabling a driver to manipulate the vehicle 1 are installed, a driver seat 15 on which the driver is seated, cluster displays 51 and 52 configured to display operation information of the vehicle 1, and navigation system 70 configured to provide an audio function and a video function in addition to a navigation function for providing route guidance information according to the driver's manipulation command may be provided.

The dashboard 14 may protrude toward the driver from the lower portion of the windscreen 11 to enable the driver to manipulate various kinds of devices installed in the dashboard 14 while keeping his/her eyes forward.

The driver seat 15 may be disposed behind the dashboard 14 so that the driver can drive the vehicle 1 in a comfortable position while keeping his/her eyes forward and on the various kinds of devices of the dashboard 14.

The cluster displays 51 and 52 may be disposed on the dashboard 14 around the driver seat, and may include a driving speed gauge 51 to display the driving speed of the vehicle 1, and a revolutions per minute (rpm) gauge 52 to display the rpm of the power apparatus).

The navigation system 70 may include a display configured to display information about a road on which the vehicle 1 travels or about a route to the driver's desired destination, and a speaker 41 configured to output sound according to the driver's manipulation command. Recently, many vehicles include Audio Video Navigation (AVN) system into which audio system, video system, and navigation system are integrated.

The navigation system 70 may be installed in a center fascia. The center fascia is a control panel of the dashboard 14 disposed between the driver seat and a passenger seat. The center fascia may be positioned at an area where the dashboard 14 meets a shift lever vertically, and in the center fascia, the navigation system 70, an air conditioner, a controller of a heater, a vent, a cigar jack, an ashtray, a cup holder, etc. may be installed. Also, the center fascia may function to divide the driver seat from the passenger seat, together with a center console.

Also, a jog dial 60 may be provided to enable the driver to manipulate the various kinds of devices as well as the navigation system 70.

The jog dial 60 according to the present disclosure may enable the driver to rotate it or apply pressure thereon to perform driving manipulations, and the jog dial 60 may also include a touch pad having a touch recognition function to perform handwriting recognition for driving manipulations using a user's finger or a tool having a touch recognition function.

In the following description, for convenience of description, a vehicle of detecting a target vehicle will be referred to as a vehicle, another vehicle coming toward the vehicle will be referred to as an oncoming vehicle, and another vehicle expected to influence the driving of the vehicle among oncoming vehicles will be referred to as a target vehicle. However, it will be obvious that the present disclosure is applied to all vehicles, as well as the vehicle and the target vehicle. Also, for convenience of description, the terms "vehicle", "oncoming vehicle", and "target vehicle" will be used interchangeably.

Figure 3:
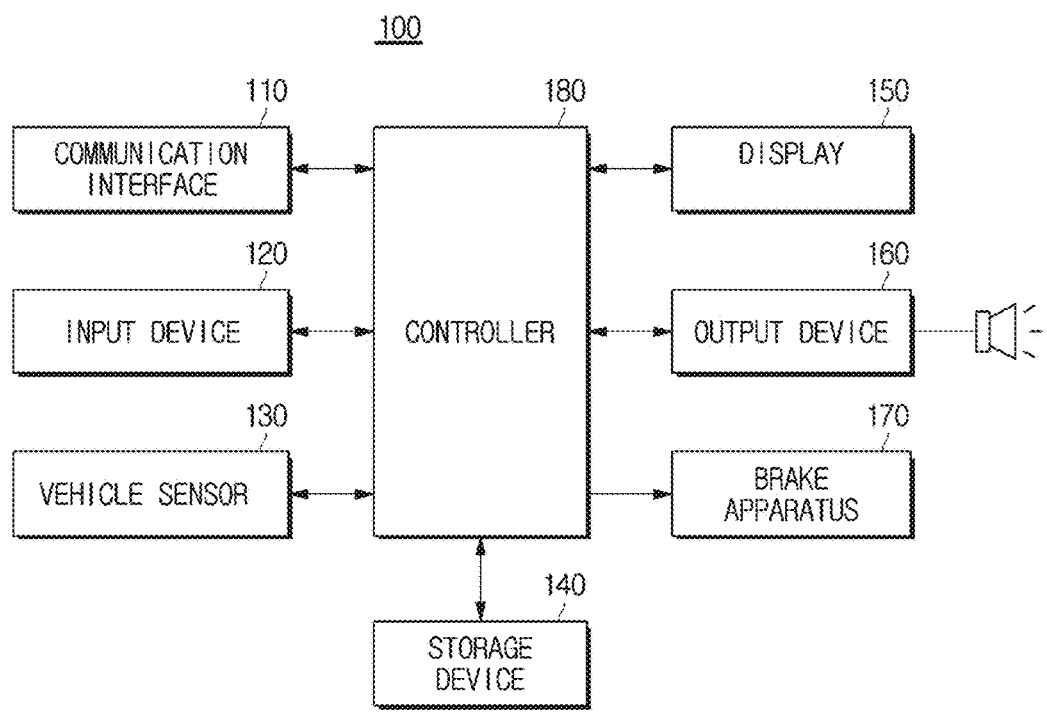
FIG. 3 is a control block diagram detailedly showing the configuration of a vehicle.

FIG. 3 is a control block diagram detailedly showing the configuration of a vehicle.

Figure 4:
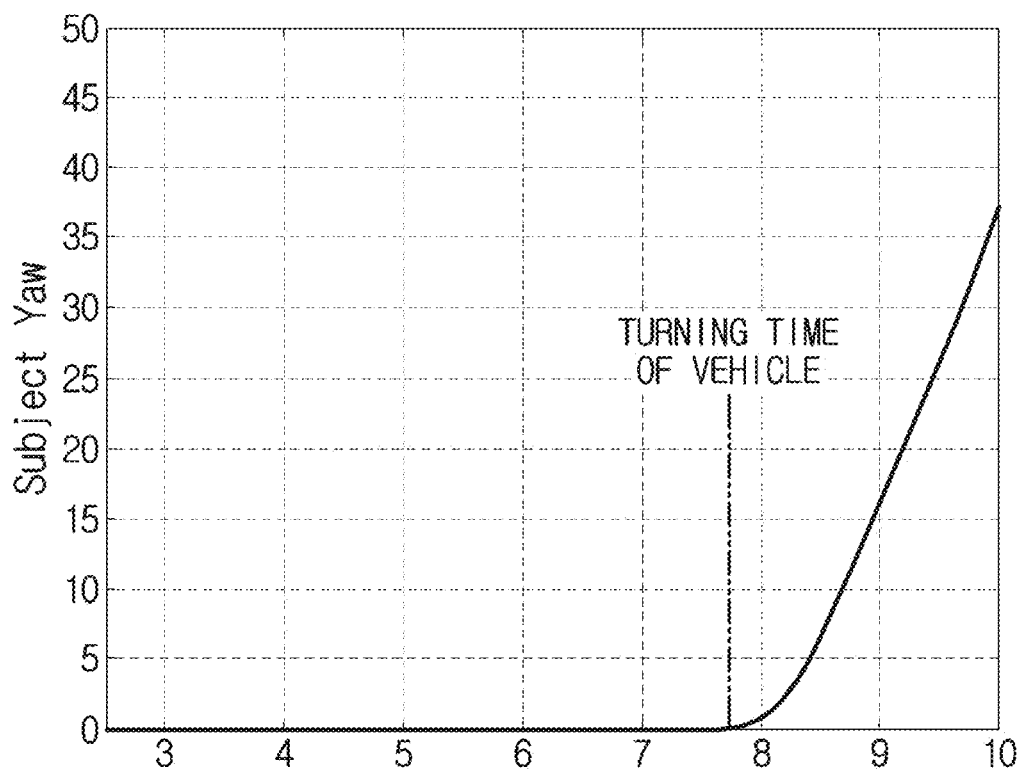
FIG. 4 shows an example for describing a method of calculating a yaw of a vehicle.
Figure 6:
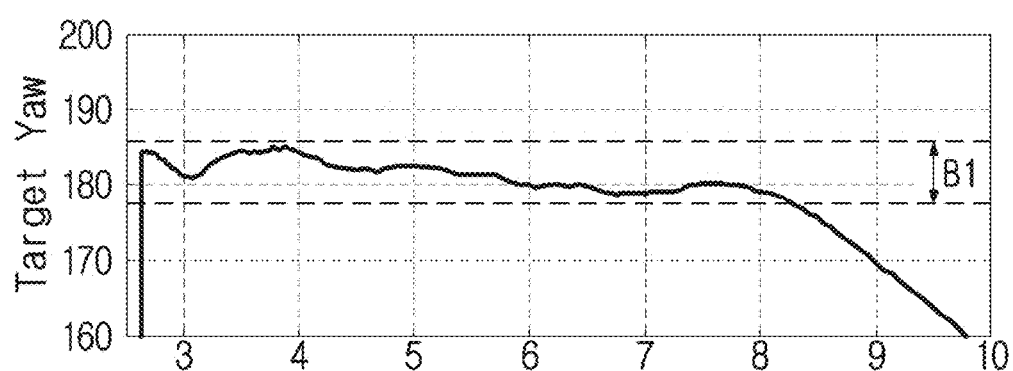
Figure 11:
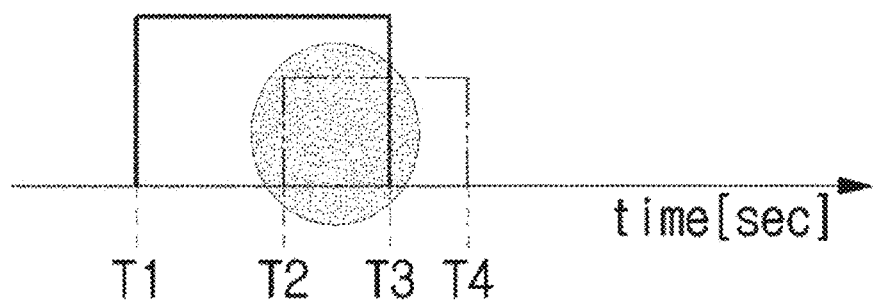
FIG. 11 shows an example for describing a method of determining the risk of collision of a vehicle with a target vehicle.

The following description will be given with reference to FIG. 4 showing an example for describing a method of calculating a yaw of a vehicle, FIGS. 5 and 6 showing examples for describing a method of detecting a target vehicle before a vehicle turns, FIGS. 7 to 10 showing examples for describing a method of detecting a target vehicle after a vehicle turns, and FIG. 11 showing an example for describing a method of determining the risk of collision of a vehicle with a target vehicle.

As shown in FIG. 3, a vehicle 100 may include a communication interface 110, an input device 120, a vehicle sensor 130, a storage device 140, a display 150, an output device 160, a brake apparatus 170, and a controller 180.

The communication interface 110 may include one or more components for enabling communication with an external device. For example, the communication interface 110 may include at least one of a short-range communication module, a wired communication module, and a wireless communication module.

The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range.

The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various kinds of wired communication modules, such as a Controller Area Network (CAN) communication module, a Local Area Network (LAN) module, a Wide Area Network (WAN) module, a Value Added Network (VAN) module, and the like.

The wireless communication module may include wireless communication modules supporting various wireless communication methods, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Radio Data System-Traffic Message Channel (RDS-TMS), Digital Multimedia Broadcasting (DMB), a Wireless-Fidelity (Wi-Fi) module, and a Wireless Broadband module.

The wireless communication module may include a wireless communication interface including an antenna and a receiver to receive traffic information signals. Also, the wireless communication module may further include a traffic-information signal conversion module to demodulate an analog radio signal received through the wireless communication interface into a digital control signal.

The input device 120 may include a hardware apparatus, such as various buttons or switches, a pedal, a keyboard, a mouse, a track ball, a lever, a handle, and a stick, for a user's inputs.

Also, the input device 120 may include a Graphic User Interface (GUI), that is, a software apparatus, such as a touch pad, for a user's inputs. The touch pad may be implemented as a Touch Screen Panel (TSP) so as to form an inter-layer structure with the display 150.

The vehicle sensor 130 may be used to sense the state of the vehicle 100, such as the steering angle and yaw rate of the vehicle 100.

More specifically, the vehicle sensor 130 may include a radar sensor to recognize a target through a camera for photographing images and information reflected by emitted electronic waves, and to determine a distance and direction to the target, and may acquire information, such as a distance to an oncoming vehicle, relative speed, a direction, etc., based on the results of the recognition and determination. The acquired information may be used to determine the risk of collision of the vehicle 100 with the oncoming vehicle, to issue a warning, and to perform sudden brake.

Also, the vehicle sensor 130 may include a Steering Angle Sensor (SAS) to determine a driver's driving intention, a Wheel Speed Sensor (WSS), a pressure sensor, etc., to sense the driving state of the vehicle 100, such as a steering angle, wheel speed, a gear stage, etc.

Also, the vehicle sensor 130 may include a yaw rate sensor and a lateral G sensor, implemented in an Airbag Control Unit (ACU) and an Electronic Stability Control (ESC).

The storage device 140 may be used to store various information related to the vehicle 100. The storage device 140 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, such as Hard Disk Drive (HDD) and Compact Disc Read Only Memory (CD-ROM), although not limited to these. The storage device 140 may be memory implemented as a separate chip from the processor described above in regard of the controller 180, or the storage device 140 and the processor may be integrated into a single chip.

The display 150 may be used to display various information related to the vehicle 100, in addition to displaying information about the risk of collision with a target vehicle. The display 150 may be implemented as cluster displays (51 and 52 of FIG. 2) or the display of the navigation system 70 although not limited to these. That is, the display 150 may be implemented as any kind of display capable of providing a driver inside the vehicle 100 with information.

The display 150 may be a Cathode Ray Tube (CRT), a Digital Light Processing (DLP) panel, a Plasma Display Panel (PDP), a Light Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, although not limited to these.

The output device 160 may be used to output various information related to the vehicle 100, such as the risk of collision of the vehicle 100 with the target vehicle, in the form of voice.

The brake system 170 may include an actuator with Electronic Stability Control (ESC), to brake the vehicle 100 according to the control of the controller 180.

The controller 180 may detect a target vehicle from among oncoming vehicles located within a target yaw before turning, based on information sensed through the vehicle sensor 130.

The controller 180 may detect one or more oncoming vehicles located within a target yaw before turning, based on information (for example, whether there is an oncoming vehicle, a distance to an oncoming vehicle, the driving direction of an oncoming vehicle, relative speed, etc.) sensed through the camera or the radar sensor, and detect a vehicle located close to the vehicle 100 or approaching the vehicle 100 from among the oncoming vehicles, as a target vehicle.

Also, if the controller 180 detects a turning time (a turning time of FIG. 4) of the vehicle 100 based on information sensed through the vehicle sensor 130, the controller 180 may calculate a yaw of the vehicle 100 to set a target yaw after turning, and detect a target vehicle located within the target yaw after turning.

At this time, the controller 180 may detect one or more oncoming vehicles located within the target yaw after turning, based on information (for example, whether there is an oncoming vehicle, a distance to an oncoming vehicle, the driving direction of an oncoming vehicle, relative speed, etc.) sensed through the camera or the radar sensor, and detect a vehicle located close to the vehicle 100 or approaching the vehicle 100 from among the oncoming vehicles, as a target vehicle.

The target yaw before turning means a reference area for determining a target vehicle approaching the vehicle 100 before the vehicle 100 turns, and the target yaw after turning means an area for determining a target vehicle approaching the vehicle 100 after the vehicle 100 turns.

The controller 180 may set the target yaw before turning to a range that is greater than or equal to a value obtained by subtracting a first error value (a predetermined angle, tolerance) from 180 degrees and that is smaller than or equal to a value obtained by adding a second error value (a predetermined angle, tolerance) to 180 degrees as the following relation.

That is, $180°-\text{error value} \leq \text{target yaw before turning} \leq 180°+\text{error value}$ In embodiments, when the subject vehicle is driving straight, the first error value (a predetermined angle) and the second error value (a predetermined angle) have the same value such that the angular range for object detection is symmetric with respect to the forward direction (the x-axis direction as illustrated in FIG. 5). In embodiments, when the subject vehicle is driving is making a left or right turn, the first error value (a predetermined angle) can be adjusted to have different values from the second error value (a predetermined angle) using a rate of change in the vehicle's moving direction such that the angular range for object detection is asymmetric with respect to the vehicle's forward direction (the x-axis direction as illustrated in FIG. 7).

Referring to FIGS. 5 and 6, when the vehicle 100 travels on a straight road or before the vehicle 100 turns, a range (B1 of FIG. 6) obtained by applying an error value to 180 degrees with respect to the vehicle 100 may be set to a target yaw for detecting a target vehicle.

If a steering angle signal and a steering angular speed value measured by a vehicle sensor are greater than or equal to a reference value, the controller 180 may determine that the vehicle 100 intends to turn. The vehicle sensor may be a steering angle sensor.

FIG. 4 shows yaw data of the vehicle 100. A time at which yaw data of the vehicle 100 maintained at "0" increases may be determined as a turning time of the vehicle 100 at which the vehicle 100 is determined to turn.

Also, the controller 180 may calculate a yaw of the vehicle 100 according to Equation (1), below.

$$\varphi = \int_{t1}^{t} \gamma \, dt, \quad (1)$$

where φ represents a yaw of a vehicle, γ represents a yaw rate, t represents a current time, and t1 represents a turning time of the vehicle.

That is, the controller 180 may calculate a yaw of the vehicle 100 by integrating a yaw rate value measured through the yaw rate sensor from the turning time of the vehicle 100 to the current time.

Also, the controller 180 may use the yaw of the vehicle 100 to calculate a range that is greater than or equal to a value obtained by subtracting the yaw of the vehicle 100 from 180 degrees with respect to the vehicle 100 and that is smaller than or equal to a value obtained by adding the yaw of the vehicle 100 to 180 degrees with respect to the vehicle 100, and set the range to a target yaw after turning.

At this time, the controller 180 may set the target yaw after turning to a range that is greater than or equal to a value obtained by subtracting the yaw of the vehicle 100 from 180 degrees with respect to the vehicle 100 and then subtracting an error value (a predetermined angle) from the result of the subtraction.

That is, 180°−error value−α(yaw of the vehicle 100) ≤target yaw after turning≤180°+α(yaw of the vehicle 100).

Figure 8:
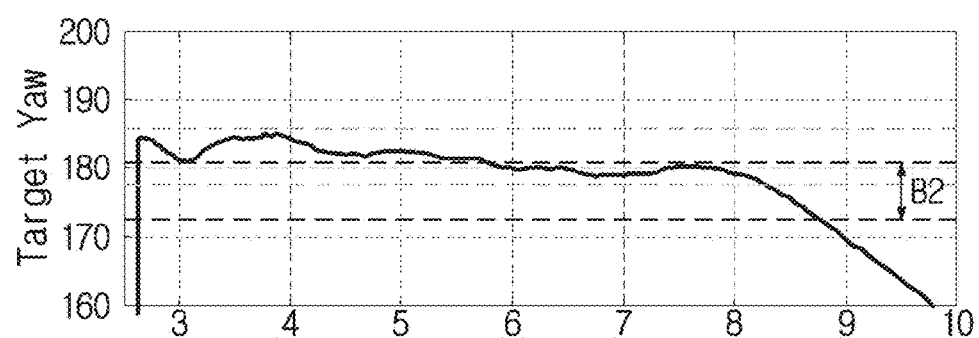

Referring to FIGS. 7 and 8, if the vehicle 100 turns, the yaw α of the vehicle 100 may be applied to 180 degrees with respect to the vehicle 100 so that a range that is greater than or equal to a value obtained by subtracting the yaw α from 180 degrees with respect to the vehicle 100 and that is smaller than or equal to a value obtained by adding the yaw α to 180 degrees may be set to a target yaw (B2 of FIG. 8) after turning for detecting a target vehicle. At this time, the target yaw for detecting the target vehicle may be set by further subtracting an error value (a predetermined angle) from the value obtained by subtracting the yaw α from 180 degrees.

Figure 9:
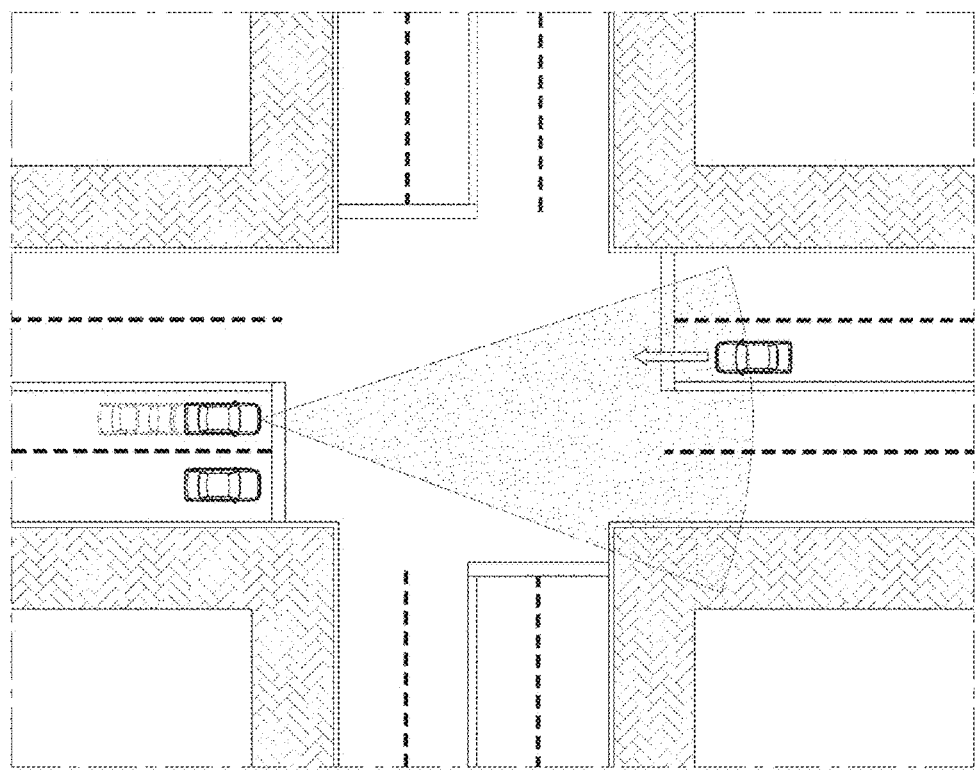
Figure 10:
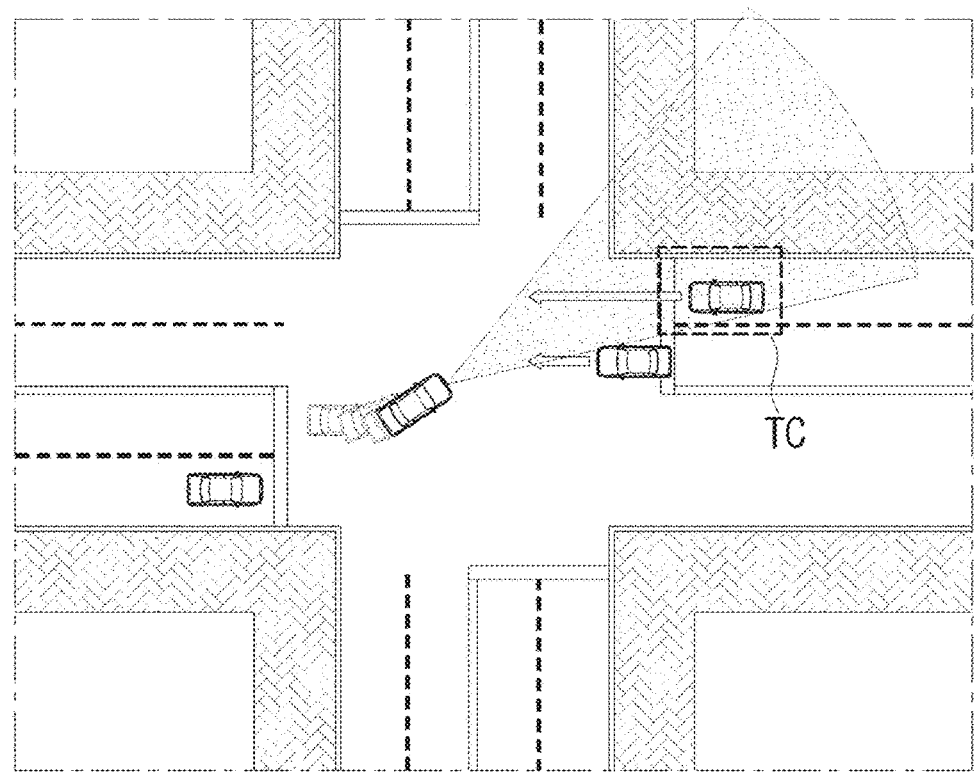

In the present disclosure, since the vehicle 100 can detect a target vehicle even after turning, the vehicle 100 can detect a target vehicle (TC of FIG. 10) that it could not recognize when traveling on a straight road as shown in FIG. 9 or before turning, as a target vehicle after turning. The target vehicle TC may be a vehicle hidden by an oncoming vehicle located on a first lane before the vehicle 100 turns, and located within a target yaw after turning to be detected when the vehicle 100 turns.

Also, the controller 180 may determine whether there is the risk of collision of the vehicle 100 with the target vehicle, and if the controller 180 determines that there is the risk of collision of the vehicle 100 with the target vehicle, the controller 180 may perform sudden brake control.

More specifically, the controller 180 may estimate the trajectory of the target vehicle based on the speed and location information of the target vehicle, and determine whether there is the risk of collision of the vehicle 100 with the target vehicle, using the trajectory of the target vehicle and the trajectory of the vehicle 100.

For example, referring to FIG. 11, if a time section from when the target vehicle enters an estimated turning trajectory of the vehicle 100 to when the target vehicle departs from the estimated turning trajectory of the vehicle 100 is from T1 to T3, and a time section from when the vehicle 100 enters an estimated driving trajectory of the target vehicle to when the vehicle 100 departs from the estimated driving trajectory of the target vehicle is from T2 to T4, there may be an overlapping section of T2 to T3 between the two sections, and in this case, the controller 180 may determine that the vehicle 100 may collide with the target vehicle.

If the controller 180 determines that the vehicle 100 may collide with the target vehicle, the controller 180 may output a primary risk-of-collision warning visually and audibly through the display 150 and the output device 160. If the controller 180 does not receive any manipulation for avoiding collision from the driver, the controller 180 may perform sudden brake control. The controller 180 may generate vibration in the steering handle so that the driver can recognize the risk of collision tactually.

Also, if the controller 180 determines that the driver's brake pressure applied according to the primary risk-of-collision warning is insufficient, the controller 180 may apply additional brake pressure.

The controller 180 may include memory to store algorithms for controlling the operations of components in the vehicle 100 or data for programs for executing the algorithms, and a processor to perform the above-described operation using the data stored in the memory. The memory and processor may be implemented as separate chips or as a single chip.

Figure 12:
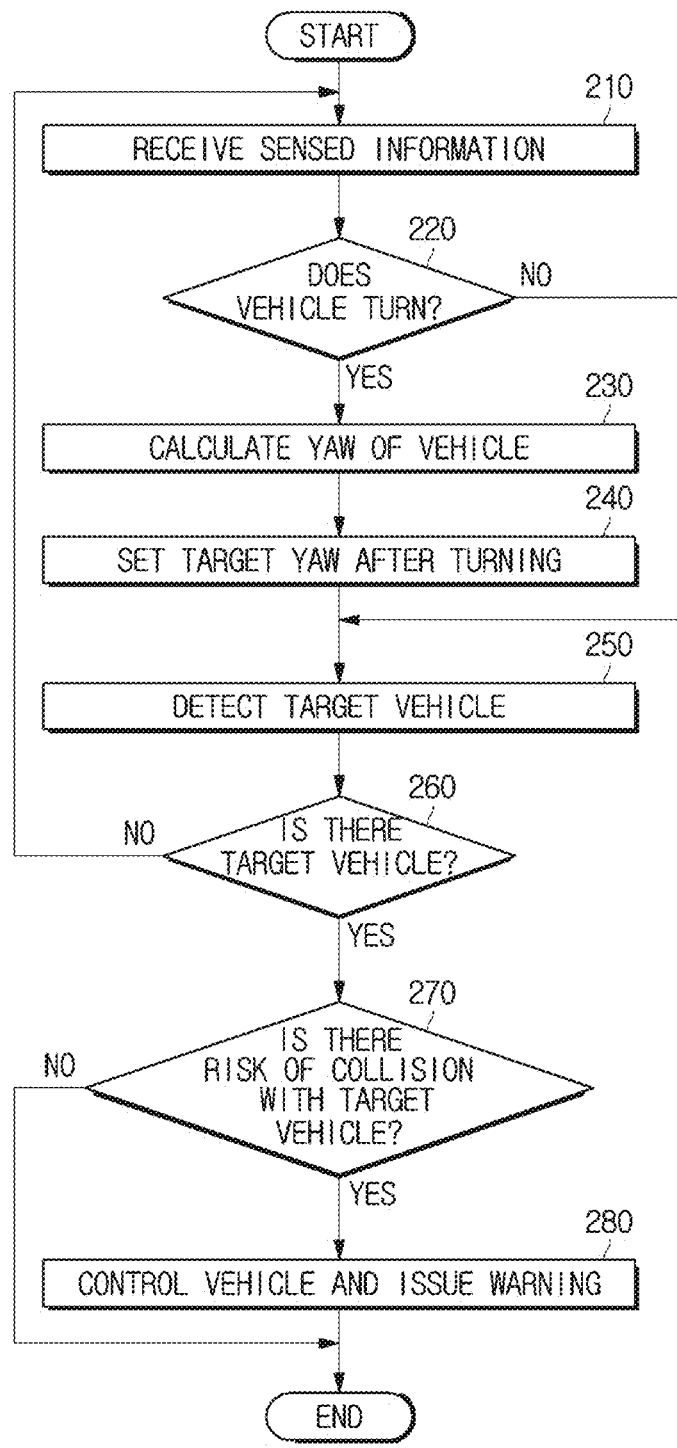
FIG. 12 is a flowchart for describing a control method of a vehicle.

FIG. 12 is a flowchart for describing a control method of a vehicle.

First, the vehicle 100 may determine whether it turns, in operation 210.

If a steering angle signal and a steering angular speed value measured by a steering angle sensor are greater than or equal to a reference value, the vehicle 100 may determine that it intends to turn.

Referring to FIG. 4, the vehicle 100 may determine a time at which yaw data of the vehicle 100 maintained at "0" increases, as a turning time of the vehicle 100.

Then, if the vehicle 100 detects a turning time of the vehicle 100, the vehicle 100 may calculate a yaw of the vehicle 100, in operations 220 and 230.

More specifically, the vehicle 100 may calculate a yaw of the vehicle 100 by integrating a yaw rate value of the vehicle 100 measured through a yaw rate sensor from the turning time of the vehicle 100 to the current time.

Then, the vehicle 100 may set a target yaw after turning using the calculated yaw of the vehicle 100, in operation 240.

More specifically, the vehicle 100 may use the yaw of the vehicle 100 calculated in operation 230 to calculate a range that is greater than or equal to a value obtained by subtracting the yaw of the vehicle 100 from 180 degrees with respect to the vehicle 100 and that is smaller than or equal to a value obtained by adding the yaw of the vehicle 100 to 180 degrees with respect to the vehicle 100, and set the range to a target yaw after turning.

At this time, the vehicle 100 may set the target yaw after turning to a range that is greater than or equal to a value obtained by subtracting the yaw of the vehicle 100 from 180 degrees with respect to the vehicle 100 and then further subtracting an error value (a predetermined range) from the result of the subtraction.

That is, 180°−error value−α (yaw of the vehicle 100)≤target yaw after turning≤180°+α (yaw of the vehicle 100)

Then, the vehicle 100 may detect a target vehicle located within the target yaw after turning, in operation 250.

If the vehicle 100 detects a target vehicle in operation 250, the vehicle 100 may output notification of detection of a target vehicle in the form of text or voice, in operation 260.

Then, the vehicle 100 may determine whether there is the risk of collision of the vehicle 100 with the target vehicle, in operation 270.

More specifically, the vehicle 100 may estimate the trajectory of the target vehicle based on the speed and location information of the target vehicle, and determine whether there is the risk of collision of the vehicle 100 with the target vehicle, using the trajectory of the target vehicle and the trajectory of the vehicle 100.

For example, referring to FIG. 11, if a time section from when the target vehicle enters an estimated turning trajectory of the vehicle 100 to when the target vehicle departs from the estimated turning trajectory of the vehicle 100 is from T1 to T3, and a time section from when the vehicle 100 enters an estimated driving trajectory of the target vehicle to when the vehicle 100 departs from the estimated driving trajectory of the target vehicle is from T2 to T4, there may be an overlapping section of T2 to T3 between the two sections, and in this case, the controller 180 may determine that the vehicle 100 may collide with the target vehicle.

If the controller 180 determines that the vehicle 100 may collide with the target vehicle, the vehicle 100 may perform sudden brake control, in operation 280.

More specifically, if the vehicle 100 determines that it may collide with the target vehicle, the vehicle 100 may output a primary risk-of-collision warning visually and audibly through the display 150 and the output device 160, and if the vehicle 100 does not receive any manipulation for avoiding collision from a driver, the vehicle 100 may perform sudden brake control. The vehicle 100 may generate vibration in the steering handle so that the driver can recognize the risk of collision tactually.

Also, if the vehicle 100 determines that the driver's brake pressure applied according to the primary risk-of-collision warning is insufficient, the vehicle 100 may apply additional brake pressure.

Meanwhile, if the vehicle 100 determines in operation 220 that it does not turn, the vehicle 100 may perform operation 250 of detecting a target vehicle from among oncoming vehicles located within a target yaw before turning. The target yaw before turning means a reference area for determining a target vehicle approaching the vehicle 100 before the vehicle 100 turns.

Herein, 180°−error value≤target yaw before turning≤180°+error value.

Referring to FIGS. 5 and 6, when the vehicle 100 travels on a straight road or before the vehicle 100 turns, a range (B1 of FIG. 6) obtained by applying an error value (a predetermined angle) to 180 degrees with respect to the vehicle 100 may be set to a target yaw for detecting a target vehicle.

Meanwhile, if the vehicle 100 determines in operation 260 that there is no target vehicle, the vehicle 100 may again perform operation 210 to operation 250.

According to the above-described embodiments, since a target yaw for detecting a target vehicle from among oncoming vehicles is set in consideration of the yaw of the vehicle if the yaw of the vehicle is detected, it is possible to detect a target vehicle in real time even after the vehicle turns.

Also, since a target vehicle located in a blind area that a driver cannot see can be detected, it is possible to enhance driving safety.

Meanwhile, the above-described embodiments may be embodied in the form of recording medium that stores commands executable by a computer. The commands may be stored in the form of program codes, and when executed by a processor, the commands may create a program module to perform the operations of the above-described embodiments. The recording medium may be embodied as computer-readable recording medium.

The computer-readable recording medium includes all kinds of recording medium that store commands interpretable by a computer. For example, the computer-readable recording medium may be ROM, RAM, a magnetic tape, a magnetic tape, a magnetic disk, flash memory, or an optical data storage device.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a vehicle sensor configured to sense a state of the vehicle including a steering angle and a yaw rate of the vehicle; and
   a controller configured to calculate a yaw of the vehicle, if a turning time of the vehicle is detected based on information sensed through the vehicle sensor, to set a target yaw after turning, and to detect a target vehicle located within the target yaw after turning.

2. The vehicle according to claim 1, wherein the vehicle sensor includes a yaw rate sensor, and
   wherein the controller calculates the yaw of the vehicle by integrating a yaw rate value measured through the yaw rate sensor from the turning time of the vehicle to a current time.

3. The vehicle according to claim 2, wherein the controller sets the target yaw after turning by using the yaw of the vehicle to calculate a range that is greater than or equal to a value obtained by subtracting the yaw of the vehicle from 180 degrees with respect to the vehicle and that is smaller than or equal to a value obtained by adding the yaw of the vehicle to 180 degrees with respect to the vehicle.

4. The vehicle according to claim 3, wherein the controller sets the target yaw after turning to a range that is greater than or equal to a value obtained by subtracting the yaw of the vehicle from 180 degrees and then further subtracting an error value from the result of the subtraction.

5. The vehicle according to claim 1, wherein the controller detects a target vehicle from among one or more oncoming vehicles located within a target yaw before turning, based on the information sensed through the vehicle sensor.

6. The vehicle according to claim 5, wherein the controller sets the target yaw before turning to a range that is greater than or equal to a value obtained by subtracting an error value from 180 degrees with respect to the vehicle and that is smaller than or equal to a value obtained by adding an error value to 180 degrees with respect to the vehicle.

7. The vehicle according to claim 1, wherein if a steering angle signal and a steering angular speed value measured by the vehicle sensor are greater than or equal to a reference value, the controller determines that the vehicle intends to turn.

8. The vehicle according to claim 1, wherein the controller determines whether there is a risk of collision of the vehicle with the target vehicle, and if the controller determines that there is a risk of collision of the vehicle with the target vehicle, the controller performs sudden brake control.

9. The vehicle according to claim 8, wherein the controller estimates a trajectory of the target vehicle based on speed and location information of the target vehicle, and determines whether there is a risk of collision of the vehicle with the target vehicle, using the trajectory of the target vehicle and a trajectory of the vehicle.

10. The vehicle according to claim 8, further comprising:
a display configured to display the risk of collision of the vehicle with the target vehicle; and
an output device configured to output the risk of collision of the vehicle with the target vehicle in the form of voice.

11. A control method of a vehicle, comprising:
determining whether the vehicle turns;
calculating a yaw of the vehicle if a turning time of the vehicle is detected;
setting a target yaw after turning using the yaw of the vehicle; and
detecting a target vehicle located within the target yaw after turning.

12. The control method according to claim 11, wherein the calculating of the yaw of the vehicle comprises calculating the yaw of the vehicle by integrating a yaw rate value of the vehicle measured through a yaw rate sensor from the turning time of the vehicle to a current time.

13. The control method according to claim 11, wherein the setting of the target yaw after turning comprises setting the target yaw after turning by using the yaw of the vehicle to calculate a range that is greater than or equal to a value obtained by subtracting the yaw of the vehicle from 180 degrees with respect to the vehicle and that is smaller than or equal to a value obtained by adding the yaw of the vehicle to 180 degrees with respect to the vehicle.

14. The control method according to claim 13, wherein the setting of the target yaw after turning comprises setting the target yaw after turning to a range that is greater than or equal to a value obtained by subtracting the yaw of the vehicle from 180 degrees and then further subtracting an error value from the result of the subtraction.

15. The control method according to claim 11, further comprising outputting notification of detection of the target vehicle in the form of text or voice, after detecting the target vehicle.

16. The control method according to claim 11, after detecting the target vehicle, further comprising:
determining whether there is a risk of collision of the vehicle with the target vehicle; and
performing sudden brake control, if the controller determines that there is a risk of collision of the vehicle with the target vehicle.

17. The control method according to claim 16, wherein the determining of whether there is the risk of collision of the vehicle with the target vehicle comprises:
estimating a trajectory of the target vehicle based on speed and location information of the target vehicle; and
determining whether there is a risk of collision of the vehicle with the target vehicle, using the trajectory of the target vehicle and a trajectory of the vehicle.

18. The control method according to claim 16, wherein the performing of the sudden brake control further comprises displaying the risk of collision of the vehicle with the target vehicle in the form of text, or outputting the risk of collision of the vehicle with the target vehicle in the form of voice.

* * * * *

UNITED STATES PATENT AND TRADEMARK OFFICE
CERTIFICATE OF CORRECTION

PATENT NO.          : 10,220,844 B2
APPLICATION NO.     : 15/470782
DATED               : March 5, 2019
INVENTOR(S)         : HyeongMin Ko et al.

Page 1 of 1

It is certified that error appears in the above-identified patent and that said Letters Patent is hereby corrected as shown below:

On the Title Page

Item [73], delete:
"HUYNDIA MOTOR COMPANY, Seoul (KR)"
And insert:
--HYUNDAI MOTOR COMPANY, Seoul (KR)--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*